(12) United States Patent
Chono

(10) Patent No.: US 12,120,437 B2
(45) Date of Patent: Oct. 15, 2024

(54) IMAGE CAPTURE DEVICE, IMAGE CAPTURE METHOD, AND IMAGE CAPTURE SYSTEM

(71) Applicant: NEC Corporation, Tokyo (JP)

(72) Inventor: Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 486 days.

(21) Appl. No.: 17/439,977

(22) PCT Filed: Feb. 20, 2020

(86) PCT No.: PCT/JP2020/006809
§ 371 (c)(1),
(2) Date: Sep. 16, 2021

(87) PCT Pub. No.: WO2020/202881
PCT Pub. Date: Oct. 8, 2020

(65) Prior Publication Data
US 2022/0174211 A1 Jun. 2, 2022

(30) Foreign Application Priority Data

Mar. 29, 2019 (JP) ................ 2019-067610

(51) Int. Cl.
H04N 23/69 (2023.01)
G06T 7/11 (2017.01)
(Continued)

(52) U.S. Cl.
CPC ............ H04N 23/951 (2023.01); G06T 7/11 (2017.01); G06T 7/292 (2017.01); G06T 7/596 (2017.01);
(Continued)

(58) Field of Classification Search
CPC ............ G06T 2207/10016; G06T 7/11; G06T 2207/30004; G06T 7/0012; G06T 7/70;
(Continued)

(56) References Cited

U.S. PATENT DOCUMENTS 8,687,086 B1 * 4/2014 Campbell ............ H04N 19/172
348/222.1
2005/0084179 A1 4/2005 Hanna et al.
(Continued)

FOREIGN PATENT DOCUMENTS

CN 101517615 A 8/2009
CN 101816018 A 8/2010
(Continued)

OTHER PUBLICATIONS

Chinese Office Action for CN Application No. 202080023545.8, mailed on Nov. 3, 2022 with English Translation.
(Continued)

Primary Examiner — Matthew C Bella
Assistant Examiner — Dennis Rosario

(57) ABSTRACT

Provided is an image capture device capable of achieving both high resolution of images and high frame rate. An image capture device 10 takes images and outputs image data, and includes region of interest compression means 11 for performing lossy compression processing on pixel data of a region of interest and outputting the pixel data.

5 Claims, 10 Drawing Sheets

(51) Int. Cl.
| | |
|---|---|
| G06T 7/292 | (2017.01) |
| G06T 7/593 | (2017.01) |
| G06T 7/70 | (2017.01) |
| G06V 40/18 | (2022.01) |
| G06V 40/19 | (2022.01) |
| H04N 13/25 | (2018.01) |
| H04N 19/167 | (2014.01) |
| H04N 19/17 | (2014.01) |
| H04N 19/597 | (2014.01) |
| H04N 23/13 | (2023.01) |
| H04N 23/45 | (2023.01) |
| H04N 23/63 | (2023.01) |
| H04N 23/695 | (2023.01) |
| H04N 23/698 | (2023.01) |
| H04N 23/90 | (2023.01) |
| H04N 23/951 | (2023.01) |
| H04N 25/40 | (2023.01) |
| H04N 21/218 | (2011.01) |

(52) U.S. Cl.
CPC .............. *G06T 7/70* (2017.01); *G06V 40/18* (2022.01); *G06V 40/19* (2022.01); *H04N 13/25* (2018.05); *H04N 19/167* (2014.11); *H04N 19/17* (2014.11); *H04N 19/597* (2014.11); *H04N 23/13* (2023.01); *H04N 23/45* (2023.01); *H04N 23/635* (2023.01); *H04N 23/69* (2023.01); *H04N 23/695* (2023.01); *H04N 23/698* (2023.01); *H04N 23/90* (2023.01); *H04N 25/41* (2023.01); *G06T 2207/20104* (2013.01); *G06T 2207/30041* (2013.01); *H04N 21/21805* (2013.01)

(58) Field of Classification Search
CPC ... G06T 2207/30244; G06T 7/97; G06T 7/55; G06T 7/557; G06T 7/593; G06T 7/596; G06T 2207/10012; G06T 2207/10021; G06T 7/292; G06T 3/4053; G06T 7/85; G06T 2207/20104; G06T 2207/30041; G06V 10/25; G06V 10/96; G06V 20/52; G06V 40/18; G06V 20/597; G06V 40/172; G06V 2201/03; G06V 20/56; G06V 20/58; G06V 20/582; G06V 20/584; G06V 20/586; G06V 20/588; G06V 20/59; G06V 20/593; G06V 40/19; G06V 10/16; H04N 19/167; H04N 23/90; H04N 23/611; H04N 23/69; H04N 25/443; H04N 25/41; H04N 23/698; H04N 23/695; H04N 25/76; H04N 25/71; H04N 21/4728; H04N 7/181; H04N 19/00; H04N 19/17; H04N 19/172; H04N 19/174; H04N 19/176; H04N 19/23; H04N 23/00; H04N 23/45; H04N 5/2628; H04N 13/204; H04N 13/243; H04N 21/21805; H04N 23/60; H04N 23/957; H04N 5/2621; H04N 23/66; H04N 23/662; H04N 21/2365; H04N 21/23655; H04N 21/43072; H04N 19/597; H04N 23/661; H04N 19/105; H04N 13/239; H04N 13/218; H04N 13/207; H04N 13/211; H04N 13/214; H04N 13/221; H04N 13/225; H04N 13/229; H04N 13/232; H04N 13/236; H04N 19/44; H04N 23/13; H04N 25/40; H04N 25/42; H04N 23/635; H04N 23/61; H04N 13/25; H04N 21/23614; H04N 1/2112; H04N 19/543; H04N 13/00; H04N 2013/0074; H04N 23/667; G06F 3/013; G06F 2203/04806; G01C 11/02; A63B 2220/806; G16H 30/40; G16H 30/00; G16H 30/20

See application file for complete search history.

(56) References Cited

U.S. PATENT DOCUMENTS

| | | |
|---|---|---|
| 2010/0309305 A1 | 12/2010 | Nakatsuka et al. |
| 2016/0007026 A1* | 1/2016 | Dong ............... G01B 11/14 375/240.08 |
| 2017/0150126 A1* | 5/2017 | Kim ................. G03B 13/36 |
| 2019/0331914 A1* | 10/2019 | Lee ................. G06F 3/013 |

FOREIGN PATENT DOCUMENTS

| | | |
|---|---|---|
| CN | 104969262 A | 10/2015 |
| CN | 106845445 A | 6/2017 |
| CN | 108073889 A | 5/2018 |
| EP | 3321850 A1 | 5/2018 |
| JP | H10-137225 A | 5/1998 |
| JP | 2005-295379 A | 10/2005 |
| JP | 2006-130325 A | 5/2006 |
| JP | 2010-134735 A | 6/2010 |
| JP | 2010-239221 A | 10/2010 |
| JP | 2010-283724 A | 12/2010 |
| JP | 2014-099923 A | 5/2014 |
| JP | 2015-037279 A | 2/2015 |
| WO | 2007/045001 A1 | 4/2007 |
| WO | 2010/022185 A1 | 2/2010 |

OTHER PUBLICATIONS

Extended European Search Report for EP Application No. EP20782912.8 dated on Apr. 4, 2020.
Zamora N H et al: "Resource-aware video processing techniques for ambient multimedia systems", 2004 IEEE International Conference On Multimedia and Expo : Jun. 27-30, 2004, Taipei, Taiwan, IEEE Operations Center, Piscataway, NJ, vol. 2, Jun. 27, 2004 (Jun. 27, 2004), pp. 1471-1474, p. 1472: "lossy. . . Roi".
Indian Office Action for IN Application No. 202147042841 mailed on May 2, 2022.
Japanese Office Action for JP Application No. 2021-511213, mailed on Oct. 11, 2022 with English Translation.
International Search Report for PCT Application No. PCT/JP2020/006809, mailed on May 19, 2020.
English translation of Written opinion for PCT Application No. PCT/JP2020/006809, mailed on May 19, 2020.
Hosoya, "Identification System by iris Recognition", Transactions of the Japanese Society for Medical and Biological Engineering vol. 44, No. 1, 2006, pp. 33-39.
J.Daugman, "How Iris Recognition Works", IEEE Transactions On Circuits and Systems for Video Technology, vol. 14, No. 1, Jan. 2004.

* cited by examiner

IrisCode

Mask

IMAGE CAPTURE DEVICE, IMAGE CAPTURE METHOD, AND IMAGE CAPTURE SYSTEM

This application is a National Stage Entry of PCT/JP2020/006809 filed on Feb. 20, 2020, which claims priority from Japanese Patent Application 2019-067610 filed on Mar. 29, 2019, the contents of all of which are incorporated herein by reference, in their entirety.

TECHNICAL FIELD

This disclosure relates to an image capturing device, an image capturing method, and an image capturing system that are suitably applied to biometric authentication.

BACKGROUND ART

Biometric authentication using an iris, i.e., iris authentication is well known. In iris authentication, the iris of an authenticated person is photographed using an imaging device, and features are extracted from the photographed iris pattern. When authenticating an authenticated person, the extracted features are compared with features registered in a database in advance, and a pass/fail decision is made based on a matching score. When the authenticated person is registered, the extracted features are registered in the database.

The iris, which is a donut-shaped tissue that surrounds the pupil, has a very complex pattern. In addition, the iris is unique to each individual. Non-patent literature 1 describes an iris authentication system. In that iris authentication system, the eyes of the authenticated person are irradiated with near-infrared light when the iris is photographed.

In addition, non patent literature 2 describes that when iris authentication is performed, it is preferable that an iris image (an image containing the iris) is photographed with a resolution that can represent the range of the iris with 80 to 130 pixels. Assuming that the diameter of the iris is about 1 cm, it is more desirable to capture the range of the iris with a high resolution of 200 pixels or more for certainty of feature extraction.

A walk-through iris authentication device that enables iris authentication without requiring the authenticated person to remain still has been proposed (refer to, for example, patent literature 1). Hereinafter, the iris authentication by a walk-through iris authentication device is referred to as walk-through iris authentication. In the walk-through iris authentication device, a camera takes a picture of an authenticated person who keeps walking. The iris pattern is then extracted from the captured image, and the features of the iris pattern are matched against the registered features. The walk-through authentication is used for entry/exit control at an entrance gate.

CITATION LIST

Patent Literature

Patent literature 1: Japanese Patent Laid-Open No. 2010-134735
Patent literature 2: Japanese Patent Laid-Open No. 2014-99923

Non Patent Literature

Non Patent literature 1: Hosoya, "Identification System by iris Recognition", Transactions of the Japanese Society for Medical and Biological Engineering 44(1), pages 33-39, 2006.

Non Patent literature 2: J. Daugman, "How Iris Recognition Works", IEEE TRANSACTIONS ON CIRCUITS AND SYSTEMS FOR VIDEO TECHNOLOGY, Vol. 14, No. 1, January 2004.

SUMMARY OF INVENTION

Technical Problem

For example, assume that a pedestrian as an authenticated person walks at a speed of 2 m/s and an image is taken in a shooting environment using a lens with a depth of field of 20 mm. The time for the pedestrian to pass through the 20 mm is 20 mm/2000 m m/s=0.01 seconds. Therefore, in order to grasp the pedestrian within a focusing range, the image must be obtained at a high frame rate of 100 frames/s or more. Patent literature 2 describes that the imaging device outputs images at a frame rate of about 100 frames/s.

The image of the authenticated person is generally obtained by an image sensor. As mentioned above, high resolution is required for images used for biometric authentication. Therefore, an image sensor with a large number of pixels is used. For example, when an imaging device incorporating an image sensor takes a picture of an authenticated person from a distance of 2 meters, it is desirable to use an image sensor with a length and width of 1000 pixels when the range of the iris can be captured with a high resolution of 200 pixels or more. In addition, as mentioned above, since the image should be obtained at a high frame rate, it is required that pixel data be read out from the image sensor at a high speed.

However, there is a limit to the number of pixel data that can be output by the image sensor in a unit of time (for example, one second). Therefore, it may be difficult to achieve both the desired high resolution and high frame rate.

Solution to Problem

An image capture device according to the present disclosure includes region of interest compression means for performing lossy compression processing on pixel data of a region of interest and outputting the pixel data.

An image capture system according to the present disclosure includes the above mentioned image capture device, control means for controlling the image capture device, and a wide area imaging device having a wider angle of view than that of the image capture device, wherein the control means includes position determining means for determining a position of the region of interest, based on an image captured by the wide area imaging device.

An image capture method according to the present disclosure performs lossy compression processing on pixel data of a region of interest in an image obtained by an image sensor.

DESCRIPTION OF EMBODIMENTS

Hereinafter, an example embodiment is described with reference to the drawings.

Figure 1:
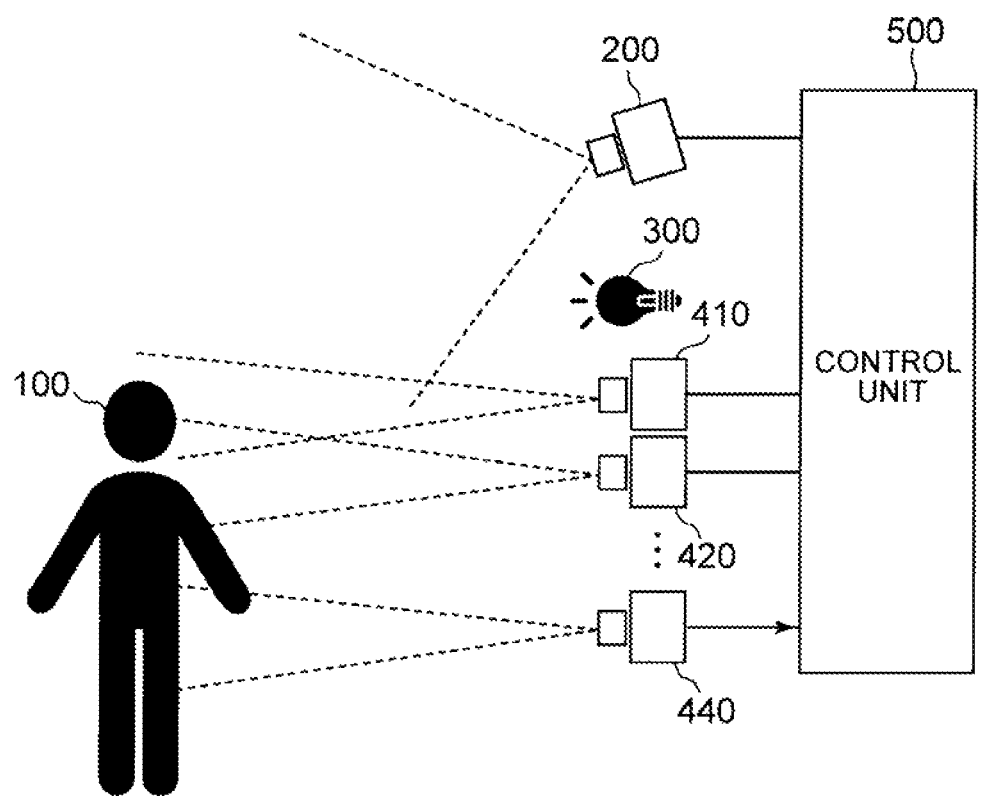
FIG. 1 It depicts a block diagram showing a configuration example of an imaging system.

FIG. 1 is a block diagram of an example of an image capturing system (imaging system). The imaging system shown in FIG. 1 includes a whole overlooking camera (wide area imaging camera (wide angle camera): wide area imaging device) 200 that takes a picture of an area including the face of an authenticated person 100, a lighting device 300, four iris imaging cameras 410-440 arranged in a vertical direction, and a control unit 500. Three iris imaging cameras 410, 420, 440 are illustrated in FIG. 1. In addition, the angle of view of the wide area imaging camera 200 is wider than that of the iris imaging cameras 410-440. Specifically, for example, the wide area imaging camera 200 is capable of capturing the entire body of persons of various heights. The number of iris imaging cameras is not limited to three.

Each of the plurality of iris imaging cameras 410-440 is arranged so that the image captured by each iris imaging camera partially overlaps the image captured by the adjacent iris imaging camera. However, not all of the eye of a person should be included in the overlapping area of the images.

The lighting device 300 includes a light source (for example, LED: Light Emitting Diode). The lighting device 300 emits light (for example, near-infrared light) to the authenticated person 100. The height of a plurality of authenticated persons may vary. A plurality of iris imaging cameras 410-440 are provided to deal with a large number of authenticated persons of different heights.

The control unit 500 determines the iris imaging camera that can capture the eye region suitably among the plurality of iris imaging cameras 410-440, based on the wide area image supplied from the wide area imaging camera 200. In addition, the control unit 500 determines the ROI (Region of Interest) in the image captured by the determined iris imaging camera. Specifically, the position in the vertical direction (vertical position) of the region of interest is determined.

In other words, the region of interest in this example embodiment is a portion of the area in the image (captured image) photographed by the iris imaging camera. The width of the portion of the area is the same as the width of the captured image, but the height is a fraction of the height of the whole image. The region of interest is set to include the iris image.

Next, the control unit 500 informs the iris imaging camera that has been determined of the vertical position of the region of interest. The iris imaging camera outputs pixel data of the region of interest identified by the vertical position of the region of interest to the control unit 500.

The control unit 500 can be realized by a personal computer, for example.

FIG. 2A through FIG. 2D are explanatory diagrams showing an example of the iris authentication process.

Figure 2A:
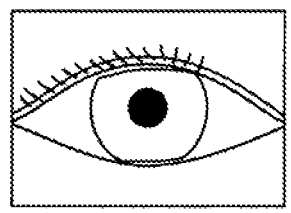
FIG. 2A It depicts an explanatory diagram showing an example of iris authentication process.
Figure 2B:
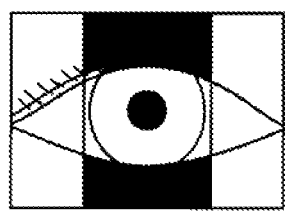
FIG. 2B It depicts an explanatory diagram showing an example of iris authentication process.
Figure 2C:
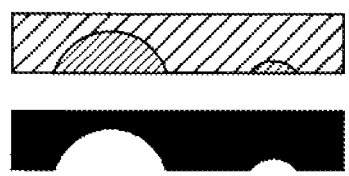
FIG. 2C It depicts an explanatory diagram showing an example of iris authentication process.
Figure 2D:
FIG. 2D It depicts an explanatory diagram showing an example of iris authentication process.
Figure 2D:

The iris image shown in FIG. 2A is segmented as shown in FIG. 2B. The segmentation is a process of finding a pupil in the iris and a limbus boundary, for example. Then, as shown in FIG. 2C, the image is normalized by applying a polar coordinate transformation, for example, to be transformed into a rectangular image. The boundary between the iris and the eyelid region is detected, and the eyelid region is masked. Then, the feature of the iris is analyzed and an iris code is generated (refer to FIG. 2D).

In this example embodiment, a data compression process (encoding process: Encode) is applied to image data of the region of interest output from the iris imaging cameras 410-440 to the control unit 500 in order to reduce the amount of data.

Even if the image to be analyzed is shifted by a few bits with respect to the original iris image (for example, the image shown in FIG. 2A), the shift does not affect the feature of the pattern in the iris (such as a direction of the pattern). In other words, a shift of a few bits does not change the feature of the pattern.

Therefore, even if lossy compression is applied to the image data in order to reduce the amount of image data output from the iris imaging cameras 410-440 to the control unit 500, the feature of the pattern in the iris is not compromised in the image recovered from the lossy compressed image data (decoded image).

In this example embodiment, the amount of data of the image of the region of interest output from the iris imaging cameras 410-440 to the control unit 500 is reduced without compromising the feature of the pattern in the iris. In other words, by setting the region of interest and applying lossless compression to the image data, it is possible to achieve both high resolution and high frame rate of the image.

Figure 3:
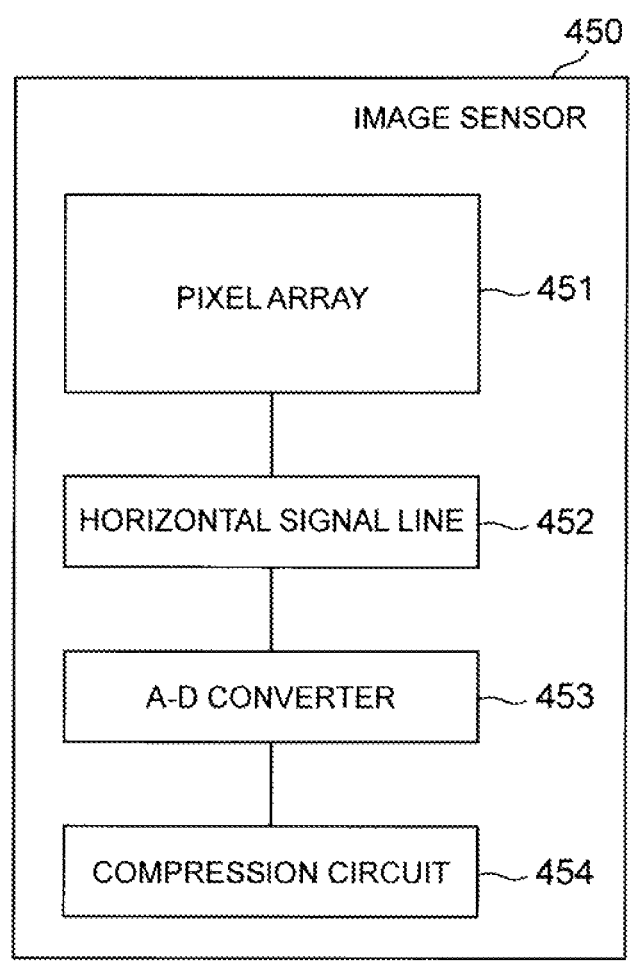
FIG. 3 It depicts a block diagram showing a configuration example of an image sensor.

FIG. 3 is a block diagram showing an example of the configuration of an image sensor 450 that can be mounted on each of iris imaging cameras 410-440. The image sensor 450 shown in FIG. 3 is based on a CMOS (Complementary Metal Oxide Semiconductor) image sensor, but the image sensor 450 may also be based on a CCD (Charge Coupled Device) image sensor.

The image sensor 450 includes a pixel array 451, a horizontal signal line 452, an A-D converter 453, and a compression circuit 454. The image sensor 450 is formed by an integrated circuit of a single chip. The integrated circuit may be a stacked structure (for example, a layer including the pixel array 451 and the horizontal signal line 452, and other layers).

In the pixel array 451, photodiodes (light receiving units) are provided for the number of pixels. The light received by the photodiodes is photoelectrically converted and input to the A-D converter 453 through the vertical signal line (not shown) and the horizontal signal line 452, the A-D converter 453 digitally converts the input data (according to the voltage) of each pixel and outputs it to the compression circuit 454. The A-D converter 453 digitally converts the input data of each pixel (by voltage) and outputs it to the compression circuit 454.

The compression circuit 454 performs lossy compression processing on the data of the image (data of each pixel) in the region of interest as instructed by the control unit 500.

The data after the lossy compression processing is then output to the control unit 500.

One example of a lossy compression process is quantization. For example, when the A-D converter 453 outputs data at 8 bits/pixel, the compression circuit 454 uses the upper 5 bits as the data for each pixel. Another example of lossy compression processing is a transform coding which encodes multiple image data together. As a transform coding, for example, there is an orthogonal transform such as a discrete cosine transform or an wavelet transform.

Another example of a lossy compression process that encodes multiple image data together is a predictive coding.

As mentioned above, there is no problem in adopting lossy compression because the feature of the pattern in the iris is not compromised in the image restored from the data of the lossy compressed image. By adopting the lossy compression process, the amount of data can be effectively reduced.

Figure 4:
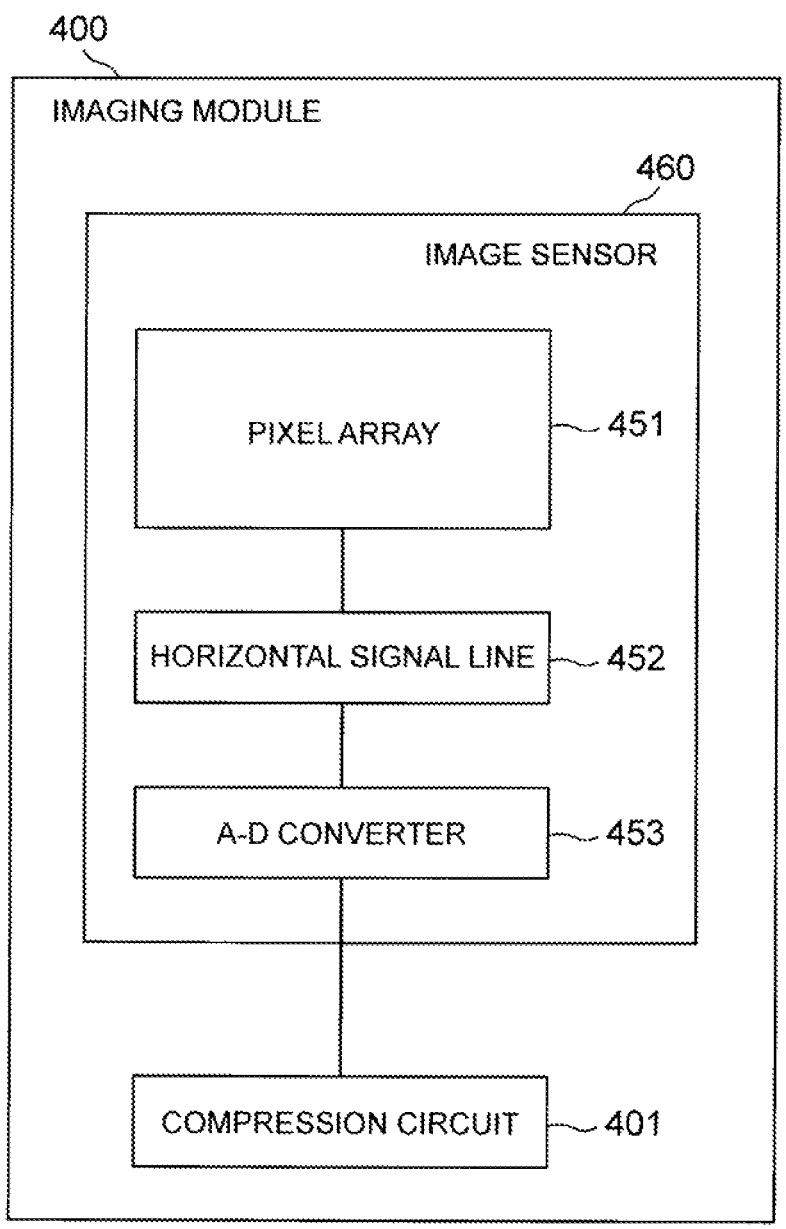
FIG. 4 It depicts a block diagram showing a configuration example of an imaging module.

FIG. 4 shows a block diagram of an example configuration of an imaging module 400 that can be mounted in iris imaging cameras 410-440 and that includes an image sensor 460. The difference between the image sensor 460 shown in FIG. 4 and the image sensor 450 shown in FIG. 3 is that the compression circuit 454 is not mounted on the image sensor 460. The image sensor 460 is formed by a single chip integrated circuit.

In other words, in the configuration example shown in FIG. 4, the image sensor 460 and the compression circuit 401 are integrally formed as an imaging module 400. The integrated formation means, for example, that they are housed in a single housing. The function of the compression circuit 401 is the same as it of the compression circuit 454. In the imaging module 400 shown in FIG. 4, a general CMOS image sensor including the A-D converter 453 can be used.

Figure 5:
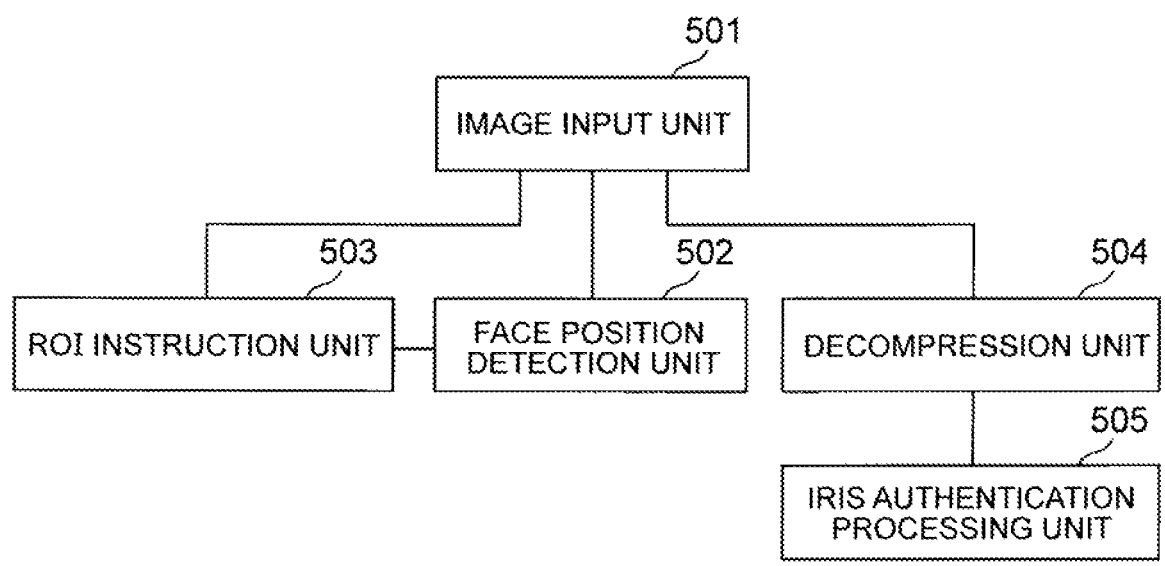
FIG. 5 It depicts a block diagram showing an example of a functional configuration of a control unit.

FIG. 5 is a block diagram showing an example of a functional configuration of the control unit 500. In the example shown in FIG. 5, the control unit 500 includes an image input unit 501, a face position detection unit 502, an ROI instruction unit 503, a decompression unit 504, and an iris authentication processing unit 505.

The image input unit 501 inputs image data from the wide area imaging camera 200 or the iris imaging cameras 410-440. The face position detection unit 502 detects the portion of the face position of the authenticated person 100 from the image (specifically, the image data) input from the wide area imaging camera 200. Specifically, the face position detecting unit 502 detects a portion of the face where the eye is captured. The face position detection unit 502 transmits the portion of the image in which the eye is captured to the ROI instruction unit 503. The ROI instruction unit 503 identifies an iris imaging camera among iris imaging cameras 410 to 440 that can capture the position of the eye based on the image data input from the wide area imaging camera 200. In addition, the ROI instruction unit 503 specifies a position of the iris image in the image captured by the identified iris imaging camera based on the image data input from the wide area imaging camera 200. Then, the ROI instruction unit 503 instructs the identified iris imaging camera of the vertical position of the region of interest including the iris image.

When specifying the position of the iris image, the ROI instruction unit 503 uses, for example, camera parameters of the wide area imaging camera 200 and the iris imaging cameras 410-440, and a position relationship between the wide area imaging camera 200 and each of the iris imaging cameras 410-440. In other words, the ROI instruction unit 503 uses the camera parameters and the position relationship to derive the iris imaging camera corresponding to the eye position of the authenticated person 100 in the image captured by the wide area imaging camera 200 and the eye position present in the image captured by the iris imaging camera.

The decompression unit 504 receives, through the image input unit 501, the lossy compression-processed data (data in which the image data of the region of interest is lossy compression-processed) output by the iris imaging camera that received the instruction of the vertical position of the region of interest. The decompression unit 504 applies the reverse process of the lossy compression processing to the received data. The iris authentication processing unit 505 performs iris authentication processing based on the inverse processed data (the image data of the region of interest is reproduced to the extent that the feature of the iris pattern are not compromised). The iris authentication process is based on the iris recognition data. The iris authentication process is the process of registering the features in the database, or the process of matching the features with the features registered in the database.

The iris imaging cameras that do not receive an instruction of the vertical position of the region of interest do not perform lossy compression processing on the image data of the region of interest.

Figure 6:
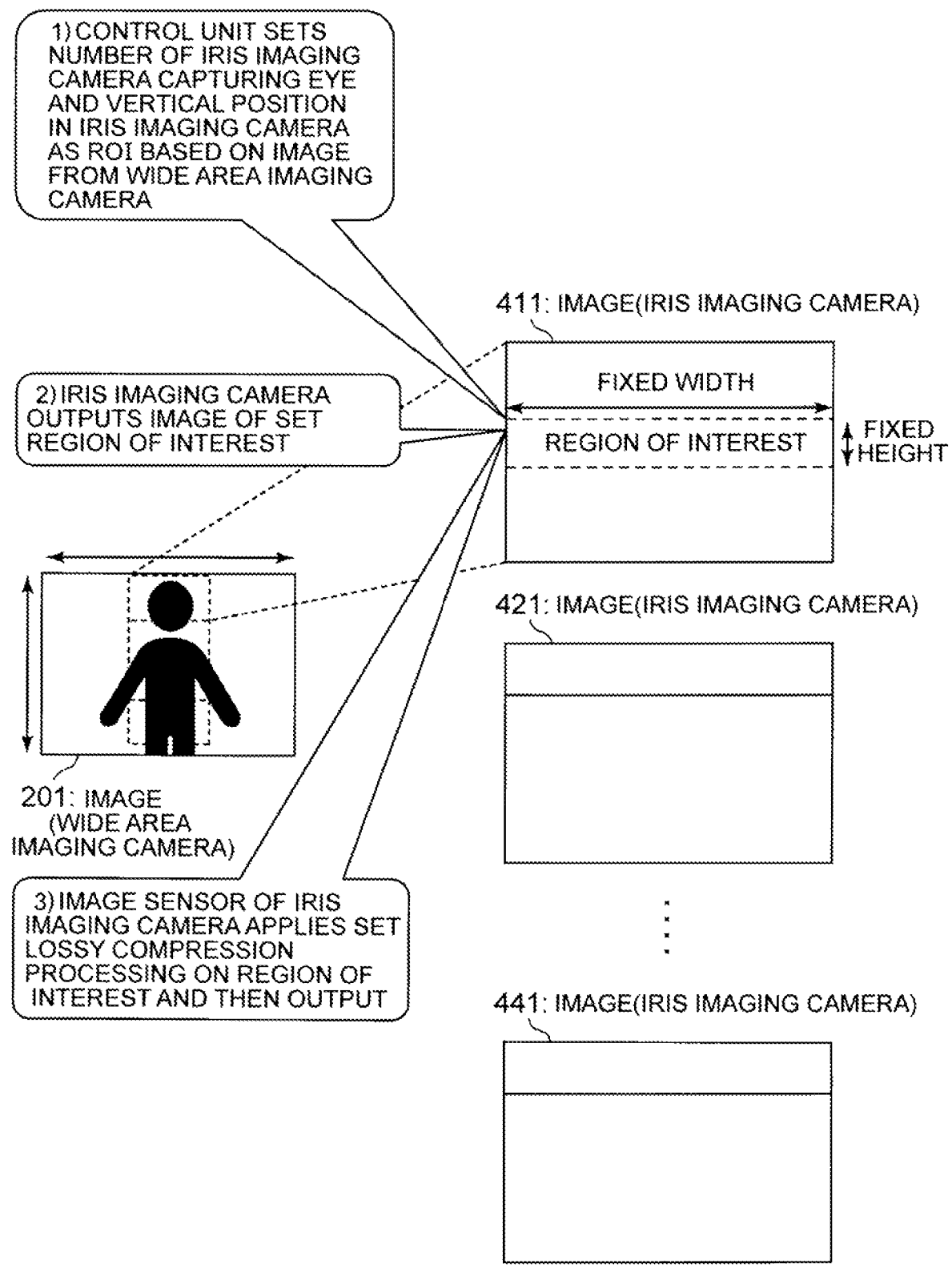
FIG. 6 It depicts an explanatory diagram of shooting and data output by an iris imaging camera.
Figure 7:
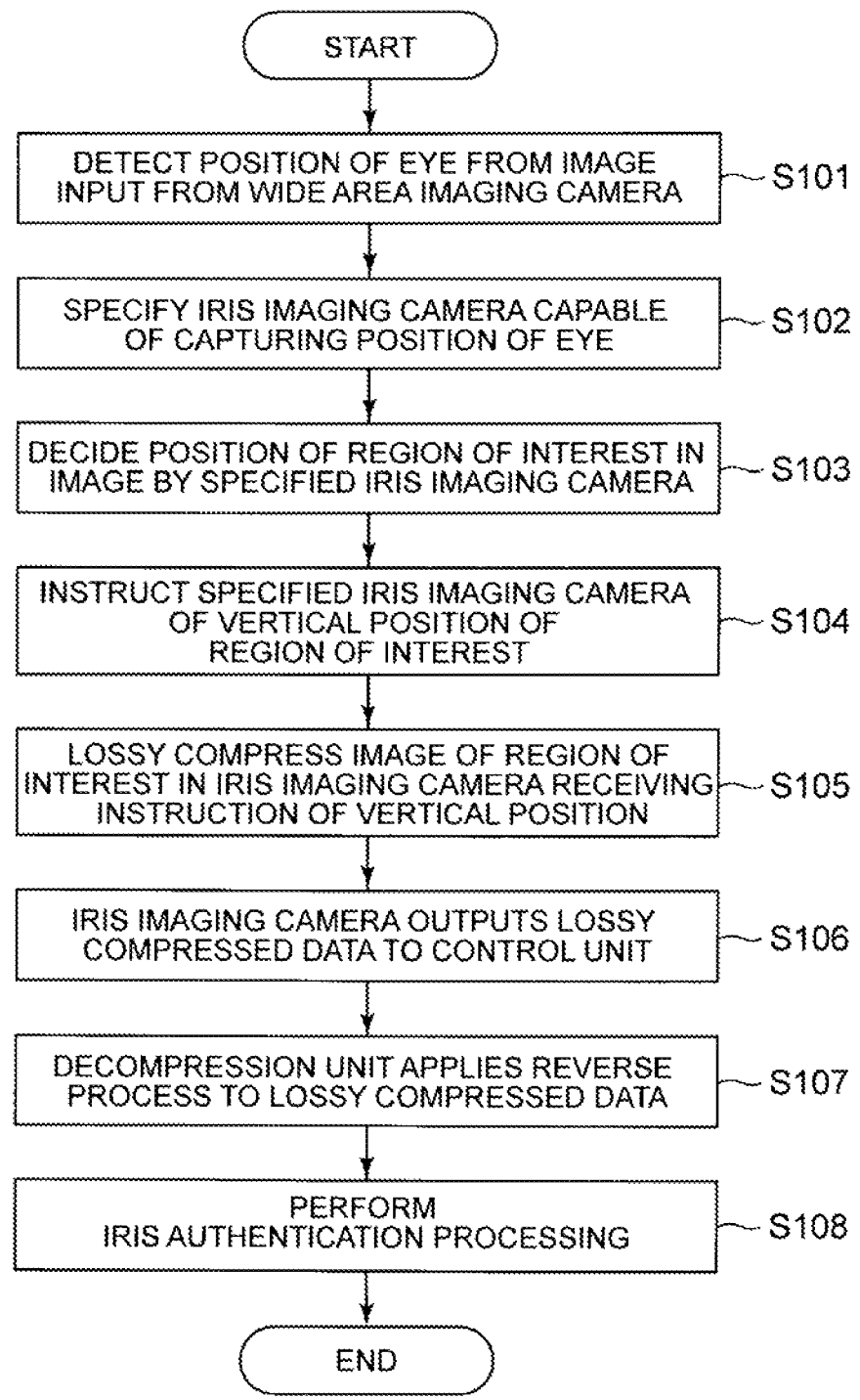
FIG. 7 It depicts a flowchart showing an operation of the imaging system.

Next, the operation of the imaging system will be described with reference to FIGS. 6 and 7. FIG. 6 is an explanatory diagram of shooting and data output by an iris imaging camera. 410-440. FIG. 7 is a flowchart showing an operation of the imaging system.

The wide area imaging camera 200 takes a picture of the area including the face of the authenticated person 100 who has reached the predetermined position. The predetermined position is, for example, a position 2 meters away from the setting position of the imaging system including the wide area imaging camera 200 and the iris imaging cameras 410-440. As described above, the face position detection unit 502 in the control unit 500 detects the position of the eye from the image 201 input from the wide area imaging camera 200 (step S101).

The face position detection unit 502 transmits the portion of the image in which the eye is captured to the ROI instruction unit 503. Hereinafter, it is assumed that the face position detection unit 502 transmits coordinates of the image in which the eye is captured to the ROI instruction unit 503. The ROI instruction unit 503 specifies an iris imaging camera among the iris imaging cameras 410-440 that can capture the position of the eye based on the image data input from the wide area imaging camera 200 (Step S102). In the example shown in FIG. 6, iris imaging camera 410 is the iris imaging camera capable of capturing the position of the eye.

In other words, the eye is captured in the image 411 captured by the iris imaging camera 410. The ROI instruction unit 503 determines an area in the image 411 where the eye is captured, based on the image data input from the wide area imaging camera 200. The size of the pixel array in the iris imaging cameras 410-440 is assumed to be 4000 horizontal pixels and 3000 vertical pixels.

Although FIG. 6 shows the image 421 captured by the iris imaging camera 420 and the image 441 captured by the iris imaging camera 440, when the iris imaging camera 410 is capable of capturing the position of the eye, the iris imaging cameras 420-440 do not actually output data to the control unit 500. The iris imaging cameras 420-440 do not output data to the control unit 500.

The ROI instruction unit 503 decides the position of the region of interest, which is an area in which the eye is reflected (step S103), and instructs the iris imaging camera 410 of the vertical position of the region of interest (step S104). In this example embodiment, the size of the region of interest is fixed. Suppose that the size of the region of interest is, as an example, 4000 horizontal pixels and 1500 vertical pixels. The vertical position of the region of interest is, for example, the upper left coordinate of the region of interest. Since the size of the region of interest is fixed, it is possible to specify the position of the region of interest by the upper left coordinate of the region of interest.

In this example, it is assumed that the iris imaging cameras 410-440 incorporate the image sensor 450 shown in FIG. 3. In the iris imaging camera 410, the section (not shown) that controls the compression circuit 454 informs the vertical position of the region of interest of the compression circuit 454.

The compression circuit 454 takes only pixel data of the region of interest identified by the vertical position among pixel data sequentially output from the A-D converter 453 (refer to FIG. 3). Then, the compression circuit 454 applies lossy compression processing of a predetermined method to the taken pixel data (step S105). Since the image sensor 450 shown in FIG. 3 incorporates the compression circuit 454, the method of lossy compression processing is determined to be a specific one when the image sensor 450 is manufactured. In addition, in the imaging module 400 illustrated in FIG. 4, the method of lossy compression processing used by the compression circuit 401 is determined when the imaging module 400 is assembled.

The compression circuit 454 outputs the lossy compressed data of the region of interest. The iris imaging camera 410 outputs the lossy compressed data to the control unit 500 (step S106).

In the control unit 500, the image input unit 501 inputs the lossy compressed data. The image input unit 501 outputs the lossy compressed data to the decompression unit 504. The decompression unit 504 applies the reverse process of the lossy compression process to the lossy compressed data (Step S107). The iris authentication processing unit 505 performs iris authentication processing based on the reverse processed data (Step S108).

In this example embodiment, the iris imaging cameras 410-440 output only the data of the image of the region of interest to the control unit 500. In addition, the iris imaging cameras 410-440 apply lossy compression to the data of the image of the region of interest. Therefore, it is possible to achieve both high resolution and high frame rate of images between the iris imaging cameras 410-440 and the control unit 500.

In addition, in this example embodiment, the size of the region of interest is fixed. Therefore, the image sensor 450 and the imaging module 400 can always perform the same operation with respect to the output of pixel data of the region of interest. Therefore, the processing of the image sensor 450 and the imaging module 400 is not complicated, and as a result, the circuit configuration is not complicated. In addition, in the present example embodiment, the method of lossy compression processing is determined to be a predetermined specific one. Therefore, the image sensor 450 and the imaging module 400 can always perform the same operation with respect to the lossy compression processing. In that regard, the processing of the image sensor 450 and the imaging module 400 is not complicated, and as a result, the circuit configuration is not complicated either.

Figure 8:
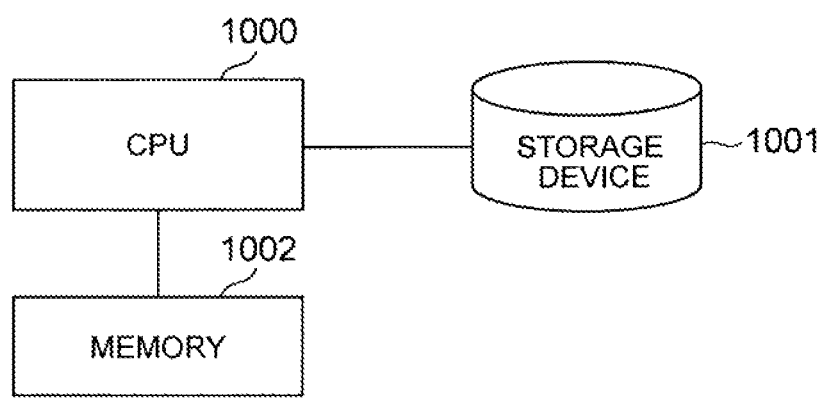
FIG. 8 It depicts a block diagram showing an example of a computer with a CPU.

FIG. 8 is a block diagram showing an example of a computer having a CPU (Central Processing Unit). The CPU 1000 executes processing in accordance with a imaging device control program stored in the storage device 1001 to realize the functions of the control unit 500 in the above example embodiments.

In other words, the CPU 1000 realizes the functions of the image input unit 501, the face position detection unit 502, the ROI instruction unit 503, the decompression unit 504, and the iris authentication processing unit 505 shown in FIG. 5.

The storage device 1001 is, for example, a non-transitory computer readable medium. The non-transitory computer readable medium includes various types of tangible storage media. Specific example of the non-transitory computer readable medium includes a semiconductor memory (for example, a mask ROM, a PROM (programmable ROM), an EPROM (erasable PROM), a flash ROM).

The memory 1002 is realized, for example, by a RAM (Random Access Memory), and is storage means for temporarily storing data when the CPU 1000 executes processing.

Figure 9:
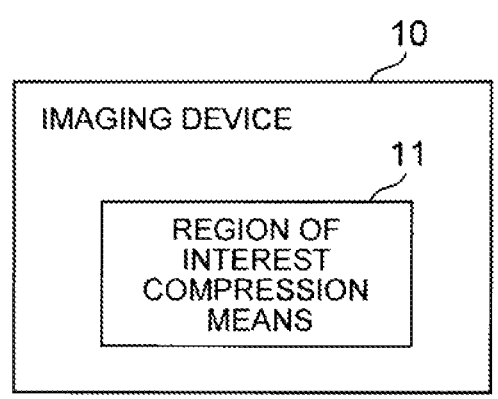
FIG. 9 It depicts a block diagram showing a main part of an image capturing device (imaging device).

FIG. 9 is a block diagram of a main part of the imaging device. The imaging device 10 shown in FIG. 9 (in the example embodiment, realized by the image sensor 450 or the imaging module 400) includes region of interest compression means 11 (in the example embodiment, realized by the compression circuit 401 or the compression circuit 454) for performing lossy compression processing on pixel data of a region of interest and outputting the pixel data.

Figure 10:
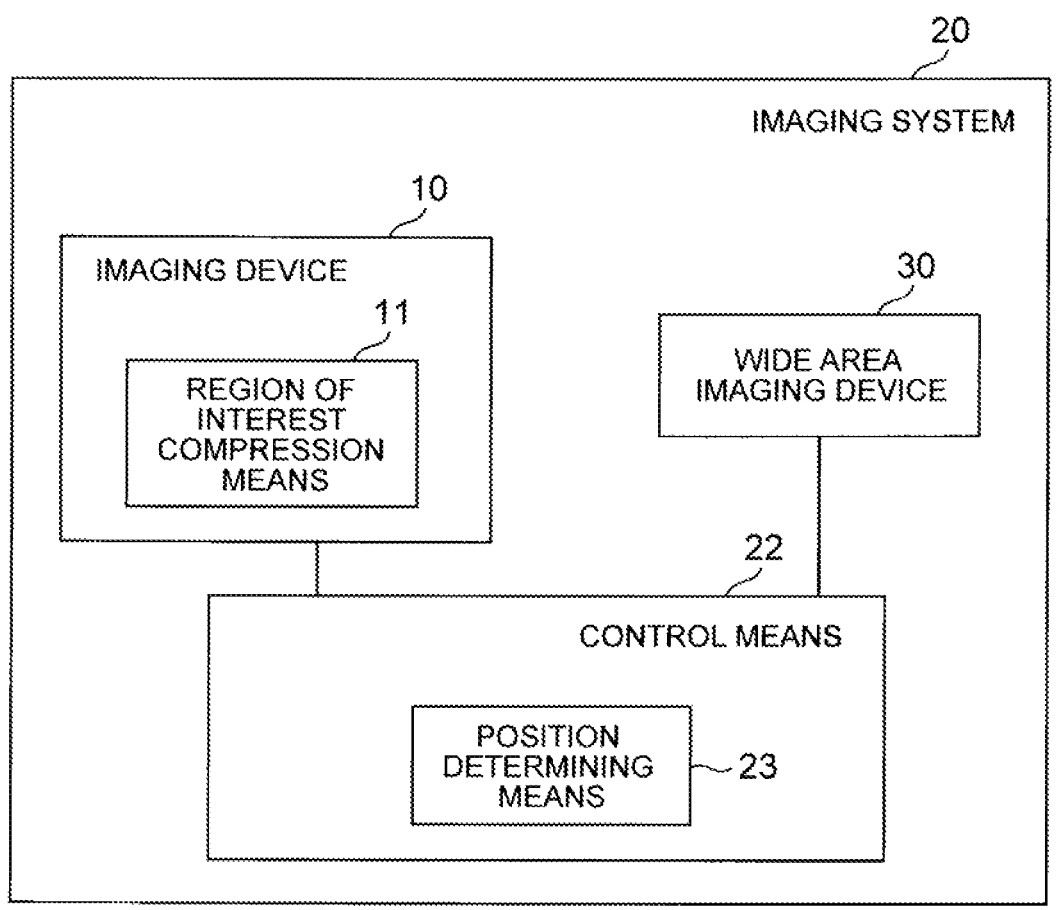
FIG. 10 It depicts a block diagram showing a main part of an imaging system.

FIG. 10 shows a block diagram of a main part of the imaging system. The imaging system 20 shown in FIG. 10 includes the imaging device (in the example embodiment, realized by the image sensor 450 or the imaging module 400), control means 22 (in the example embodiment, realized by the control unit 500) for controlling the imaging device 10, and a wide area imaging device 30 (in the example embodiment, realized by the wide area imaging camera 200) having a wider angle of view than that of the image capture device, wherein the control means 22 includes position determining means 23 (in the example embodiment, realized by the face position detection unit 502 and the ROI instruction unit 503) for determining a position of the region of interest, based on an image captured by the wide area imaging device 30.

Figure 11:
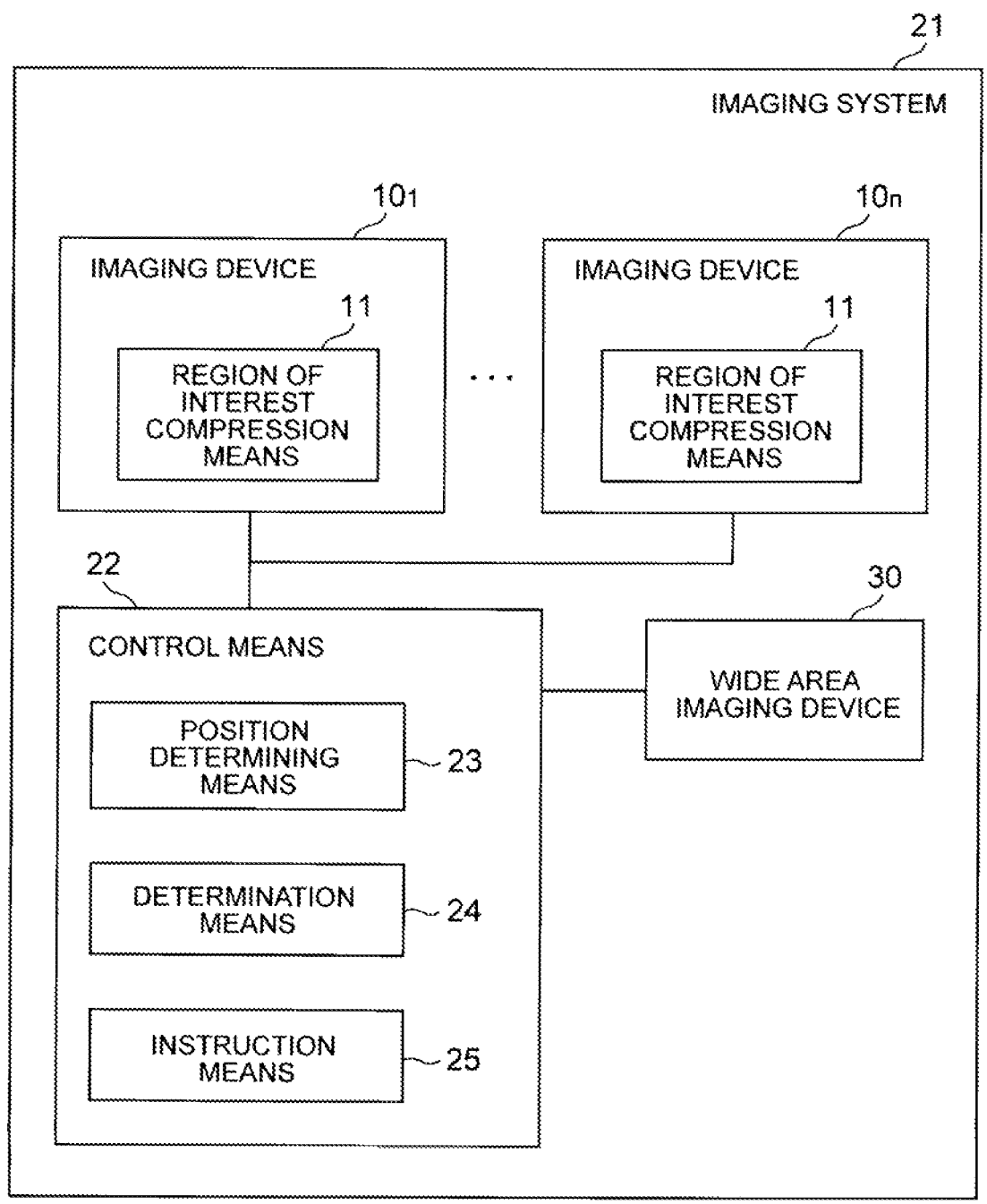
FIG. 11 It depicts a block diagram showing a main part of another type of imaging system.

FIG. 11 shows a block diagram of the main part of another type of imaging system. In the imaging system 21 shown in FIG. 11, the control means 22 determines, based on the image captured by the wide area image capturing device 30, which of the plurality of image capturing devices $10_1$-$10_n$ should be set as the region of interest in the image captured by the image capturing device 24 (in the example embodiment, the face position detection unit 502 (In the example embodiment, this is realized by the face position detection unit 502 and the ROI instruction unit 503. (In the example embodiment, this is realized by the face position detection unit 502 and the ROI instruction unit 503), and instruction means 25 (In the example embodiment, this is realized by the ROI instruction unit 503) for indicating the position of the region of interest to the image pickup device determined by the determination means 24. Only the attention area compression means 11 of the imaging device judged by the judgment means 24 performs lossy compression processing on the pixel data in the attention area.

While the present invention has been described with reference to the example embodiment, the present invention is not limited to the aforementioned example embodiment.

Various changes understandable to those skilled in the art within the scope of the present invention can be made to the structures and details of the present invention.

This application claims priority based on Japanese Patent Application No. 2019-067610 filed on Mar. 29, 2019, the disclosures of which are incorporated herein in their entirety.

REFERENCE SIGNS LIST

10, $10_1$, $10_n$ Imaging device
11 Region of interest compression means
20, 21 Imaging system
22 Control means
23 Position determining means
24 Determination means
25 Indicating means
30 Wide area imaging device
100 Authenticated person
200 Wide area imaging camera
300 Lighting device
400 Imaging module
401 Compression circuit
410-440 Iris imaging camera
450, 460 Image sensor
451 Pixel array
452 Horizontal signal line
453 A-D converter
454 Compression circuit
500 Control unit
501 Image input unit
502 Face position detection unit
503 ROI instruction unit
504 Decompression unit
505 Iris authentication processing unit
1000 CPU
1001 Storage device
1002 Memory

What is claimed is:

1. An image capture method performed by a computing device of a system including a plurality of image capture devices and a wide area imaging device having a wider angle of view than that of the plurality of image capture devices, the image capturing method comprising:
   positionally identifying a region of interest, based on an image captured by the wide area imaging device;
   determining, among images captured by the plurality of image capture devices, an image in which lossy compression processing is to be performed on the region of interest, based on the image captured by the wide area imaging device; and
   causing the image capture device that captured the determined image to perform lossy compression processing on pixel data of the region of interest in the determined image, including indicating the identified region of interest to the image capture device that captured the determined image, wherein
   only the image capture device that captured the determined image performs the lossy compression processing on the pixel data of the region of interest.

2. The image capture method according to claim 1, wherein
   the lossy compression processing of a predetermined specific method type is performed on the pixel data of the region of interest whose having a fixed size.

3. An image capture system comprising:
   a plurality of image capture devices that are each configured to perform lossy compression processing;
   a wide area imaging device having a wider angle of view than that of the image capture-device the plurality of image capture devices; and
   a processor; and
   a memory storing instructions executable by the processor to:
   positionally identify a region of interest, based on an image captured by the wide area imaging device;
   determine, among images captured by the plurality of image capture devices, an image in which lossy compression processing is to be performed on the region of interest, based on the image captured by the wide area imaging device; and
   cause the image capture device that captured the determined image to perform lossy compression processing on pixel data of the region of interest in the determined image, including indicating the identified region of interest to the image capture device that captured the determined image, wherein
   only the image capture device that captured the determined image performs the lossy compression processing on the pixel data of the region of interest.

4. The image capture system according to claim 3, wherein the processor positionally identifies the region of interest based on a position of an eye of a person in the image captured by the wide area imaging device.

5. The image capture system according to claim 3, wherein
   the lossy compression processing of a predetermined specific type is performed on the pixel data of the region of interest having a fixed size.

* * * * *